(12) United States Patent
Nakayama

(10) Patent No.: US 12,447,658 B2
(45) Date of Patent: Oct. 21, 2025

(54) SHUT-OFF NOZZLE, INJECTION DEVICE, AND INJECTION MOLDING MACHINE

(71) Applicant: THE JAPAN STEEL WORKS, LTD., Tokyo (JP)

(72) Inventor: Kiyotaka Nakayama, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 103 days.

(21) Appl. No.: 18/458,586

(22) Filed: Aug. 30, 2023

(65) Prior Publication Data
US 2024/0083082 A1   Mar. 14, 2024

(30) Foreign Application Priority Data

Sep. 14, 2022   (JP) .................................. 2022-146437

(51) Int. Cl.
| | | |
|---|---|---|
| *B29C 45/23* | (2006.01) | |
| *B29C 45/28* | (2006.01) | |
| *B29C 45/50* | (2006.01) | |
| *B29C 45/74* | (2006.01) | |

(52) U.S. Cl.
CPC ........ *B29C 45/231* (2013.01); *B29C 45/2806* (2013.01); *B29C 45/50* (2013.01); *B29C 45/74* (2013.01)

(58) Field of Classification Search
CPC ....... B29C 45/231; B29C 45/50; B29C 45/23; B29C 45/03
See application file for complete search history.

(56) References Cited

U.S. PATENT DOCUMENTS

| | | | | |
|---|---|---|---|---|
| 2008/0241300 A1* | 10/2008 | Kasahara | ............ | B29C 45/1781 425/147 |
| 2022/0184867 A1* | 6/2022 | Ochiai | .................. | B29C 45/231 |

FOREIGN PATENT DOCUMENTS

| | | | | |
|---|---|---|---|---|
| CN | 107614235 A | | 1/2018 | |
| CN | 114102997 A | * | 3/2022 | |
| DE | 1 629 704 A1 | | 2/1971 | |
| DE | 25 54 269 A1 | | 6/1977 | |
| EP | 1 974 888 A1 | | 10/2008 | |
| EP | 3 366 446 A1 | | 8/2018 | |
| GB | 1 220 607 A | | 1/1971 | |
| GB | 1561589 A | * | 2/1980 | ............ B29C 45/20 |
| JP | 3-274125 A | | 12/1991 | |

OTHER PUBLICATIONS

Extended European Search Report dated Jan. 5, 2024, issued by the European Patent Office in counterpart European Patent Application No. 23193999.2.

* cited by examiner

*Primary Examiner* — Jacob T Minskey
*Assistant Examiner* — Virak Nguon
(74) *Attorney, Agent, or Firm* — Sughrue Mion, PLLC

(57) ABSTRACT

A shut-off nozzle includes a nozzle body portion having an in-nozzle flow path formed therein, and a needle valve that is inserted into the nozzle body portion coaxially with the nozzle body portion and is configured to open and close an outlet of the in-nozzle flow path. A cylindrical portion is formed in the vicinity of a tip portion of the needle valve. A cylindrical hole portion is formed in the vicinity of a tip portion of the in-nozzle flow path, the cylindrical hole portion being a cylindrical hole. The cylindrical portion is configured to be fitted into the cylindrical hole portion in a case where the needle valve is driven in a forward direction.

15 Claims, 6 Drawing Sheets

SHUT-OFF NOZZLE, INJECTION DEVICE, AND INJECTION MOLDING MACHINE

CROSS-REFERENCE TO RELATED APPLICATIONS

This application is based on and claims priority under 35 USC 119 from Japanese Patent Application No. 2022-146437 filed on Sep. 14, 2022, the entire content of which is incorporated herein by reference.

TECHNICAL FIELD

The present disclosure relates to a shut-off nozzle in which a needle valve is coaxially provided in a nozzle body portion to open and close a resin flow path, an injection device including such a shut-off nozzle, and an injection molding machine.

BACKGROUND

A shut-off nozzle provided in an injection device of an injection molding machine can prevent so-called drooling by opening and closing an injection flow path of an injection nozzle through which resin flows. Examples of the shut-off nozzle include a type disclosed in JPH3-274125A. This type of shut-off nozzle includes a nozzle body and a needle valve provided obliquely with respect to the nozzle body. The needle valve is inserted into an oblique needle hole formed in the nozzle body to reach an internal injection flow path from an outer peripheral surface of the nozzle body. When the needle valve is moved forward, the injection flow path is closed, and when the needle valve is moved backward, the injection flow path is opened.

SUMMARY

There is also a type of shut-off nozzle in which a needle valve is provided coaxially with a nozzle body. In the shut-off nozzle of such a type, the needle valve is inserted into an injection flow path formed in the nozzle body and is freely movable forward and backward. A tip of the needle valve has decreased diameter to form a tapered surface. When the needle valve moves forward, the tip is inserted into a tip of the injection flow path formed in the nozzle body. Then, the tapered surface comes into contact with an inner peripheral surface of the injection flow path to close the injection flow path. However, even when the injection flow path is closed by the needle valve, the closure of the injection flow path implemented by the contact between the tapered surface and the inner peripheral surface of the injection flow path may not always be sufficient, and resin leakage may occur, which easily causes drooling.

The present disclosure provides a shut-off nozzle that can prevent drooling.

Other problems and novel features will become apparent from description of the present description and the accompanying drawings.

The present disclosure is directed to a shut-off nozzle including a nozzle body portion having an in-nozzle flow path formed therein and a needle valve that is inserted into the nozzle body portion coaxially with the nozzle body portion and is configured to open and close an outlet of the in-nozzle flow path. A cylindrical portion is formed in the vicinity of a tip of the needle valve. A cylindrical hole portion that is a cylindrical hole is formed in the vicinity of a tip of the in-nozzle flow path. In the present disclosure, the cylindrical portion is configured to be fitted into the cylindrical hole portion in a case where the needle valve is driven in a forward direction.

According to the present disclosure, drooling can be prevented.

DETAILED DESCRIPTION

Figure 1:
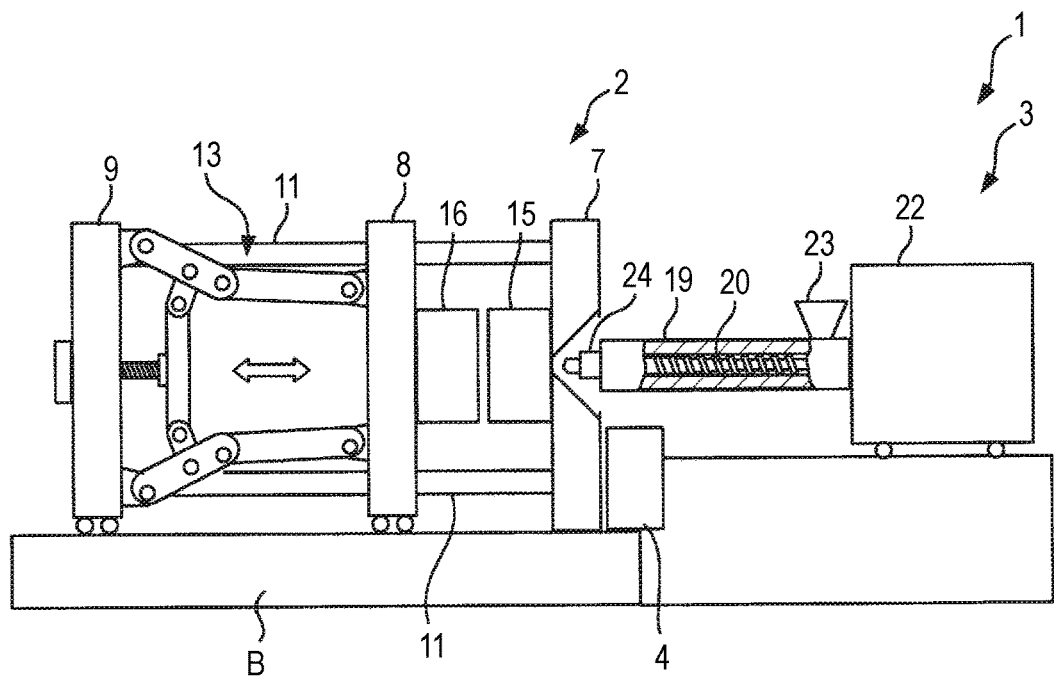
FIG. 1 is a front view showing an injection molding machine according to a first illustrative embodiment.

Hereinafter, specific illustrative embodiments will be described in detail with reference to the drawings. However, the present invention is not limited to the following illustrative embodiments. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

First Illustrative Embodiment

{Injection Molding Machine}

As shown in FIG. 1, an injection molding machine 1 according to a first illustrative embodiment includes a mold clamping device 2 and an injection device 3. The injection molding machine 1 includes a controller, that is, a control device 4. The mold clamping device 2, the injection device 3, and the like are controlled by the control device 4. The injection device 3 is provided with a shut-off nozzle 24 having a distinctive structure, which will be described in detail later.

{Mold Clamping Device}

The mold clamping device 2 includes a fixed plate 7, a movable plate 8, and a mold clamping housing 9. The fixed plate 7 is fixed to a bed B. The movable plate 8 is slidably provided on the bed B. The fixed plate 7 and the mold clamping housing 9 are connected by a plurality of tie bars 11, 11, and so on. The movable plate 8 is freely slidable between the fixed plate 7 and the mold clamping housing 9. A mold clamping mechanism, that is, a toggle mechanism 13 in the present illustrative embodiment is provided between the mold clamping housing 9 and the movable plate 8. The fixed plate 7 and the movable plate 8 are provided with a fixed mold 15 and a movable mold 16, respectively. Accordingly, the molds 15 and 16 are opened and closed when the toggle mechanism 13 is driven.

{Injection Device}

The injection device 3 includes a heating cylinder 19, a screw 20 provided in the heating cylinder 19, and a screw driving device 22. The heating cylinder 19 is supported by the screw driving device 22. The screw 20 is driven in a rotation direction and an axial direction by the screw driving device 22. The heating cylinder 19 is provided with a hopper 23 and the shut-off nozzle 24 according to the first illustrative embodiment to be described in detail below.

{Shut-Off Nozzle}

Figure 2:
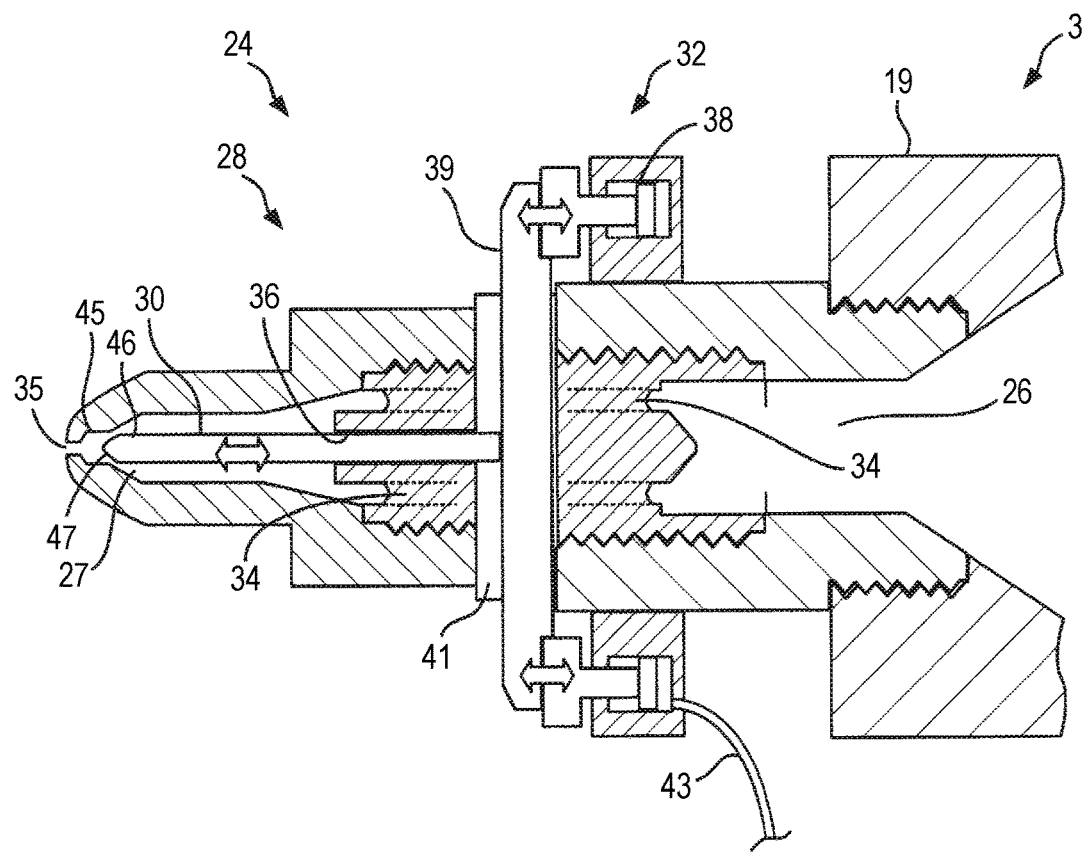
FIG. 2 is a front cross-sectional view showing a shut-off nozzle according to the first illustrative embodiment.

FIG. 2 shows the shut-off nozzle 24 according to the first illustrative embodiment. The shut-off nozzle 24 includes a nozzle body portion 28 including in-nozzle flow paths 26 and 27 therein, a needle valve 30 inserted in the nozzle body portion 28, and a needle driving mechanism 32 configured to drive the needle valve 30. When viewed with reference to a central axis of the horizontally provided heating cylinder 19, the nozzle body portion 28 is provided substantially coaxially with the heating cylinder 19. The needle valve 30 is provided coaxially with the nozzle body portion 28 and is inserted into the in-nozzle flow path 27.

The nozzle body portion 28 has communication holes 34 and 34 which establish communication between the in-nozzle flow paths 26 and 27. Therefore, resin fed from the heating cylinder 19 passes through the in-nozzle flow path 26, the communication holes 34, 34, and the in-nozzle flow path 27 and is injected from an outlet, that is, an injection port 35. An internal member of the nozzle body portion 28 has a needle hole 36, and the needle valve 30 is freely movable forward and backward with a rear end thereof being inserted in the needle hole 36.

The needle driving mechanism 32 includes an annular cylinder mechanism 38 provided to surround an outer periphery of the nozzle body portion 28 and a spring holder 39 driven by the cylinder mechanism 38. The spring holder 39 is inserted into a spring holder accommodation hole 41 that penetrates the nozzle body portion 28 in a direction perpendicular to the axis. The spring holder 39 is freely slidable forward and backward in the spring holder accommodation hole 41. The rear end of the needle valve 30 is connected to such a spring holder 39. When compressed air is supplied from an air supply pipe 43, the cylinder mechanism 38 is driven, and the needle valve 30 moves forward or backward via the spring holder 39. Accordingly, the in-nozzle flow path 27 is opened and closed.

The shut-off nozzle 24 according to the first illustrative embodiment is characterized by a shape thereof in the vicinity of a tip of the nozzle body portion 28. Specifically, the shut-off nozzle 24 according to the first illustrative embodiment is characterized by a shape of a tip of the in-nozzle flow path 27. As shown in an enlarged manner in FIG. 3A, a cylindrical hole portion 45, which is a cylindrical hole, is formed over a length L in the in-nozzle flow path 27. An inner diameter of the cylindrical hole portion 45 is slightly larger than an outer diameter of the needle valve 30 in the first illustrative embodiment. As will be described later, a portion having the same length as the cylindrical hole portion 45 in the vicinity of a tip of the needle valve 30, that is, a cylindrical portion 46 is fitted into the cylindrical hole portion 45. The cylindrical hole portion 45 can be processed using, for example, an end mill that can perform drilling. When the cylindrical hole portion 45 is formed by the end mill, the cylindrical hole portion 45 can be processed to an intended inner diameter with high accuracy without finishing. That is, processing can be performed at a low cost, and necessary accuracy can be obtained.

The shut-off nozzle 24 according to the first illustrative embodiment is also characterized by the needle valve 30. A portion from the cylindrical portion 46 to the tip of the needle valve 30 is a guide portion 47 whose diameter decreases toward the tip. Since the diameter decreases, the needle valve 30 is smoothly inserted into the cylindrical hole portion 45.

{Operation of Shut-Off Nozzle}

Figure 3A:
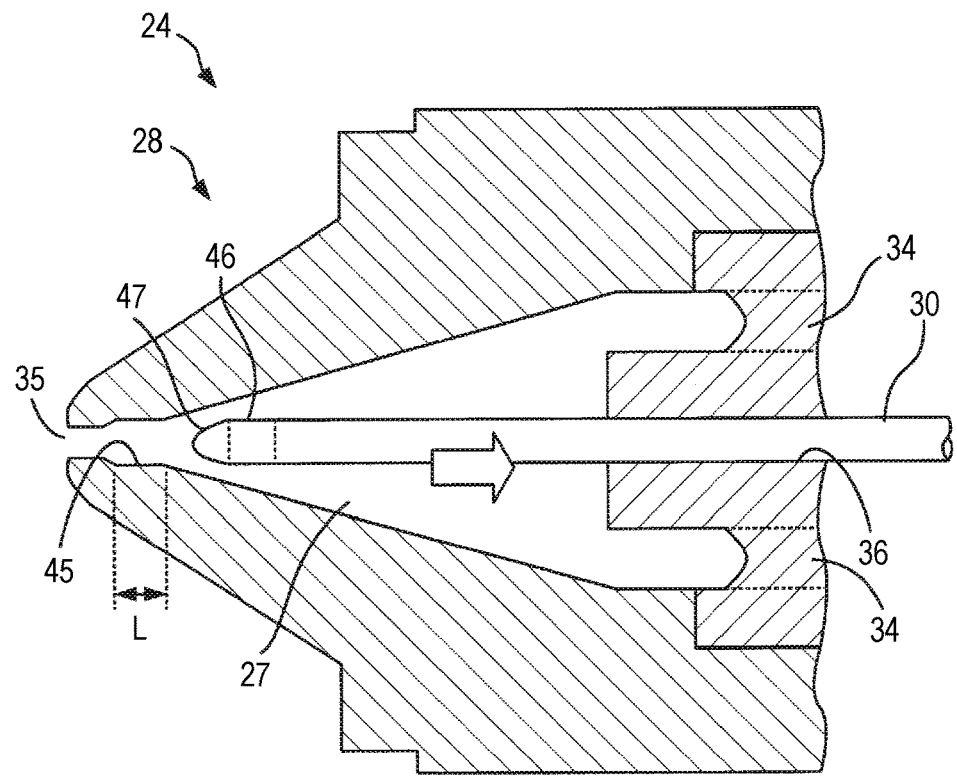
FIG. 3A is a front cross-sectional view showing a part of the shut-off nozzle according to the first illustrative embodiment in an enlarged manner.

An operation of the shut-off nozzle 24 according to the first illustrative embodiment will be described. Compressed air is supplied to the cylinder mechanism 38 of the needle driving mechanism 32 (see FIG. 2) to move the needle valve 30 backward via the spring holder 39. Then, as shown in FIG. 3A, the needle valve 30 is separated from the cylindrical hole portion 45, and the in-nozzle flow path 27 is opened. In the injection device 3 (see FIG. 1), the screw 20 is driven in a forward direction. Then, resin is fed forward, passed through the in-nozzle flow path 27 (see FIG. 3A) of the shut-off nozzle 24, and injected from the injection port 35.

Figure 3B:
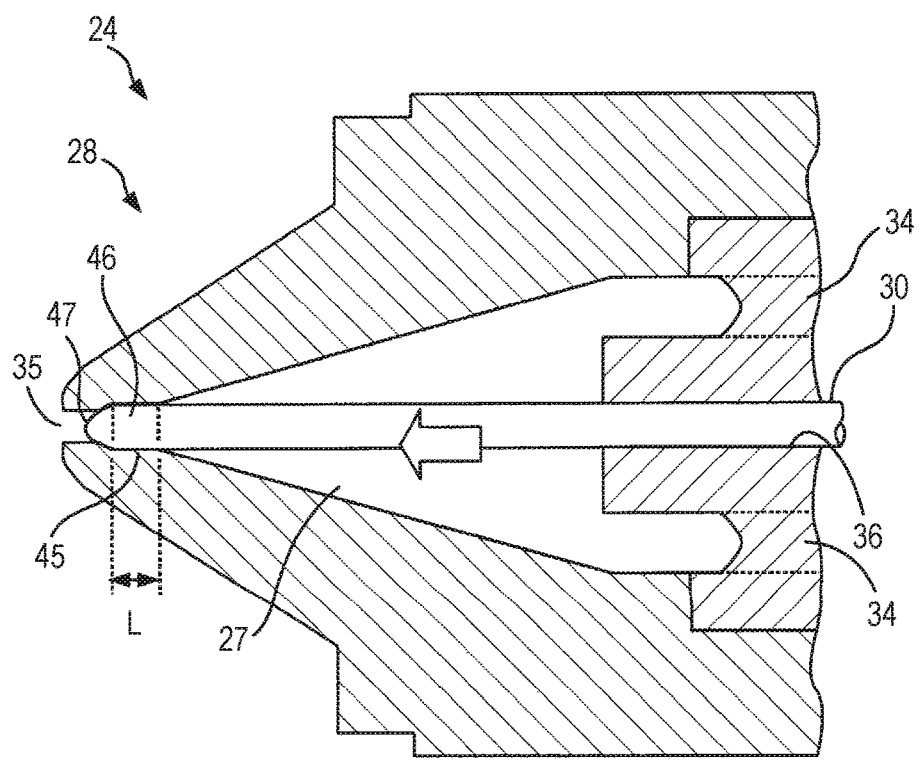
FIG. 3B is a front cross-sectional view showing a part of the shut-off nozzle according to the first illustrative embodiment in an enlarged manner.

After the injection is completed, compressed air is supplied to the cylinder mechanism 38 of the needle driving mechanism 32 (see FIG. 2) to move the needle valve 30 forward via the spring holder 39. Then, as shown in FIG. 3B, the cylindrical portion 46 of the needle valve 30 is fitted into the cylindrical hole portion 45 of the nozzle body portion 28. This state is shown in an enlarged manner in FIG. 4. As described above, the inner diameter of the cylindrical hole portion 45 is slightly larger than the outer diameter of the cylindrical portion 46 of the needle valve 30. That is, the fitting forms a clearance fit, and a mechanical seal portion 49 is formed.

The mechanical seal portion 49 is an annular gap having the length L, and resin enters the gap. However, since the gap is small, high flow resistance occurs due to viscosity of the resin. The flow resistance occurs over the length of the mechanical seal portion 49, that is, the length L of the cylindrical hole portion 45. Since the mechanical seal portion 49 is formed of a thin cylinder over the length L, a surface area of the mechanical seal portion 49 is relatively large. Therefore, the resin cannot flow due to the flow resistance. That is, the in-nozzle flow path 27 is substantially completely closed. Drooling can be prevented.

After a long period of operation, the inner diameter of the cylindrical hole portion 45 slightly increases or the outer diameter of the cylindrical portion 46 slightly decreases, and thus the gap slightly increases. However, the flow resistance of the resin acting on the entire mechanical seal portion 49 is still sufficiently large. Therefore, drooling can be prevented for a long period. In addition, even when the inner diameter of the cylindrical hole portion 45 is slightly larger or the outer diameter of the cylindrical portion 46 is slightly smaller due to processing accuracy, the flow resistance of the resin acting on the entire mechanical seal portion 49 is still sufficiently large. This is because the mechanical seal portion 49 formed of the thin cylinder receives the flow resistance over the length L. That is, drooling can be prevented. Required processing accuracy is relatively moderate.

Comparative Example

Figure 5A:
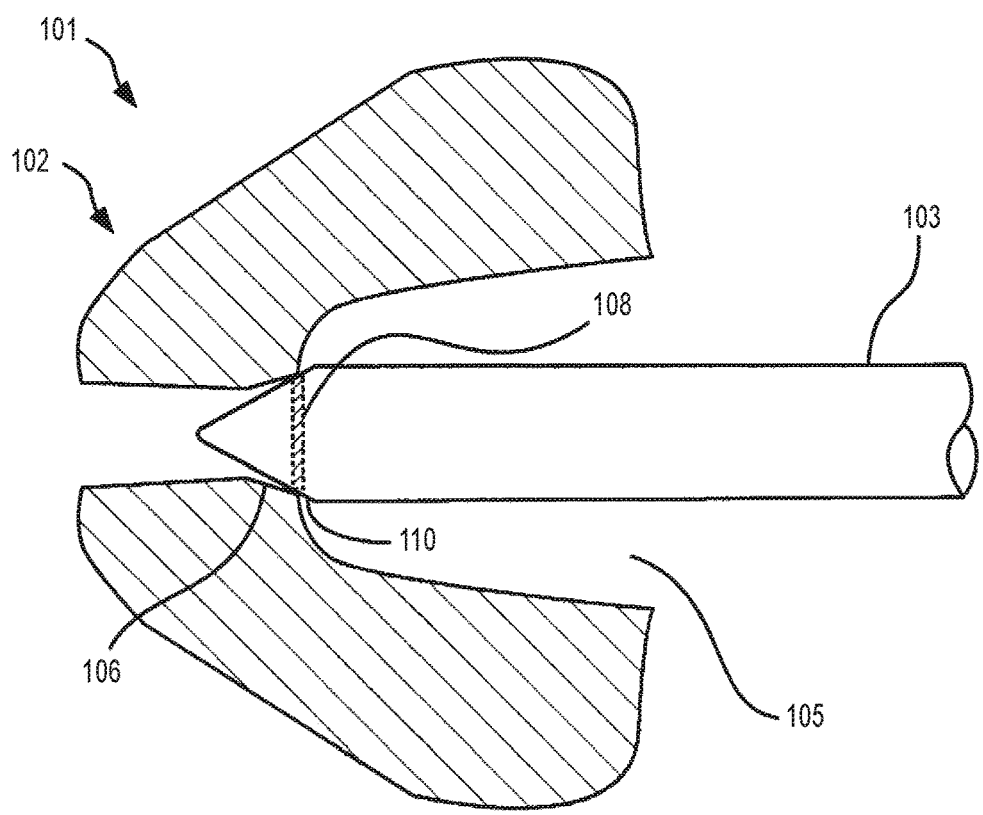
FIG. 5A is a front cross-sectional view showing a part of a shut-off nozzle according to a comparative example in an enlarged manner.
Figure 5B:
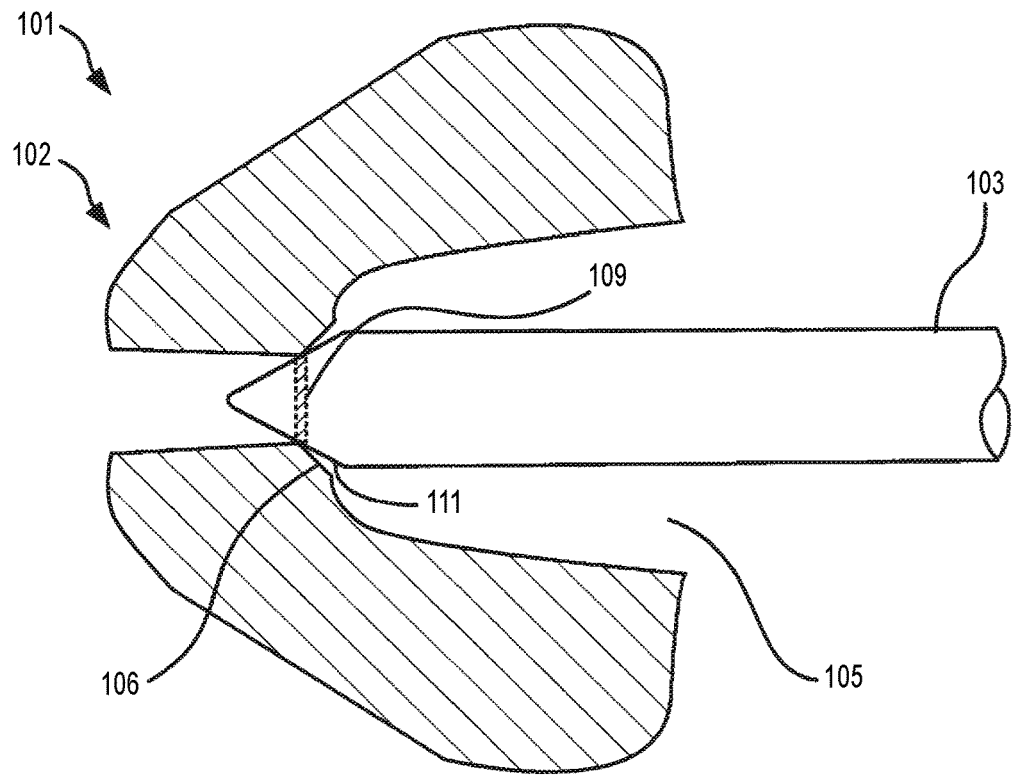
FIG. 5B is a front cross-sectional view showing a part of a shut-off nozzle according to a comparative example in an enlarged manner.

A shut-off nozzle 101 according to a comparative example will be described with reference to FIGS. 5A and 5B. The shut-off nozzle 101 according to the comparative example can also be installed to the injection molding machine 1 as shown in FIG. 1 and is driven by the needle driving mechanism 32 as shown in FIG. 2. Therefore, such description will be omitted. FIGS. 5A and 5B show the vicinity of a tip of a nozzle body portion 102 and the vicinity of a tip of a needle valve 103 of the shut-off nozzle 101 according to the comparative example. An in-nozzle flow path 105 is formed in the nozzle body portion 102, and the needle valve 103 is inserted into the in-nozzle flow path 105 coaxially with the nozzle body portion 102. The tip of the needle valve 103 is formed in a conical shape. The in-nozzle flow path 105 is formed on a conical surface 106 in the vicinity of the tip of the nozzle body portion 102.

When the needle valve 103 moves forward, the tip of the needle valve 103 is in contact with the conical surface 106 to close the in-nozzle flow path 105. However, it is difficult to completely match the conical surface 106 with a shape of the tip of the needle valve 103 from the viewpoint of processing accuracy. Therefore, the tip of the needle valve 103 is not in surface contact with the conical surface 106 but is in linear contact with the conical surface 106 as indicated by a reference numeral 108 in FIG. 5A. Alternatively, depending on a shape of the conical surface 106, the linear contact is as indicated by a reference numeral 109 in FIG. 5B. Even though a contact portion is only a linear portion, the in-nozzle flow path 105 is closed. However, when the conical surface 106 deforms due to wear or the like or the tip of the needle valve 103 is chipped after a long period of operation, seal is broken. Then, drooling occurs.

The shut-off nozzle 101 according to the comparative example has a problem in that drooling easily occurs even when resin pressure increases in the in-nozzle flow path 105. As indicated by a reference numeral 110 in FIG. 5A and as indicated by a reference numeral 111 in FIG. 5B, in a state in which the needle valve 103 closes the in-nozzle flow path 105, a part of a conical portion on the tip of the needle valve 103 is exposed in the in-nozzle flow path 105. Pressure of resin in the in-nozzle flow path 105 acts on portions denoted by the reference numerals 110 and 111, and a force in a backward direction acts on the needle valve 103. Accordingly, drooling may easily occur.

Figure 4:
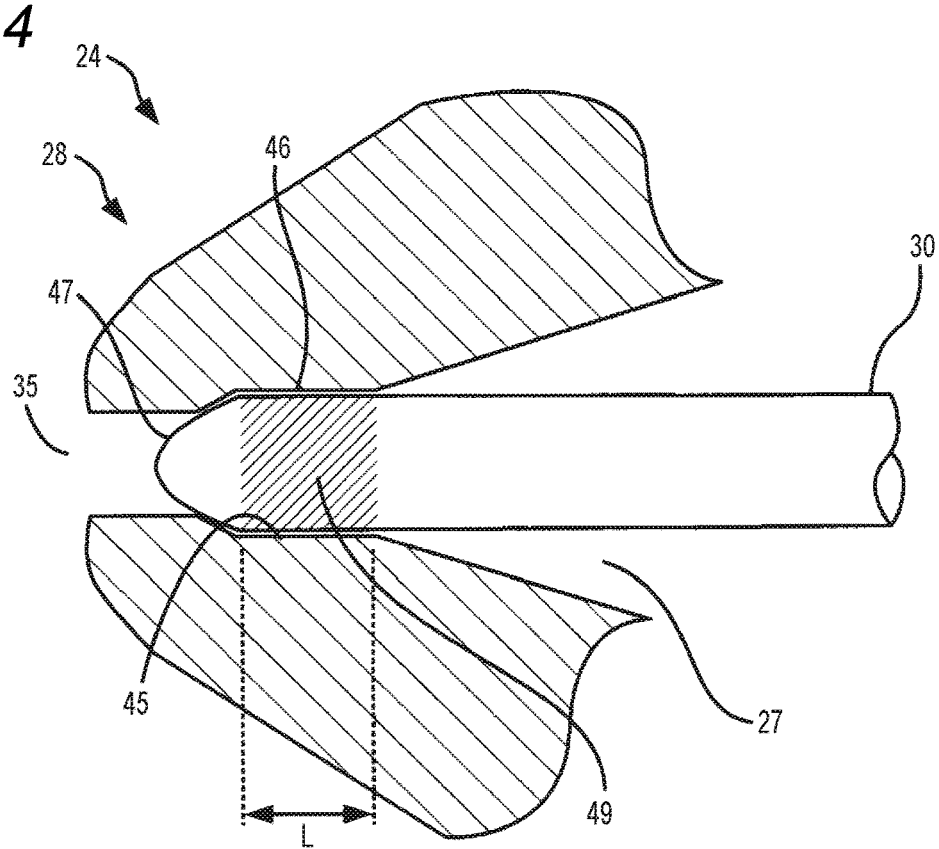
FIG. 4 is a front cross-sectional view showing a part of the shut-off nozzle according to the first illustrative embodiment in an enlarged manner.

In contrast, as shown in FIG. 4, the shut-off nozzle 24 according to the first illustrative embodiment has no conical structure exposed in the in-nozzle flow path 27 when the cylindrical portion 46 of the needle valve 30 is fitted into the cylindrical hole portion 45. Accordingly, even when resin pressure in the in-nozzle flow path 27 increases, no force acts on the needle valve 30 in the backward direction. That is, even when the resin pressure in the in-nozzle flow path 27 increases, drooling does not occur.

The shut-off nozzle 101 according to the comparative example also has a problem in that a cost for processing the conical surface 106 of the nozzle body portion 102 is high. This is because, in order to form such a conical surface 106, for example, it is necessary to perform finishing by a taper reamer having a tapered tip after drilling by an end mill. The taper reamer needs to be customized to fit a top angle of a cone of the conical surface 106. In contrast, in the shut-off nozzle 24 according to the first illustrative embodiment, the cylindrical hole portion 45 provided in the nozzle body portion 28 can be processed using the end mill as described above. Therefore, a cost required for processing is low.

Modification of First Illustrative Embodiment

Figure 6:
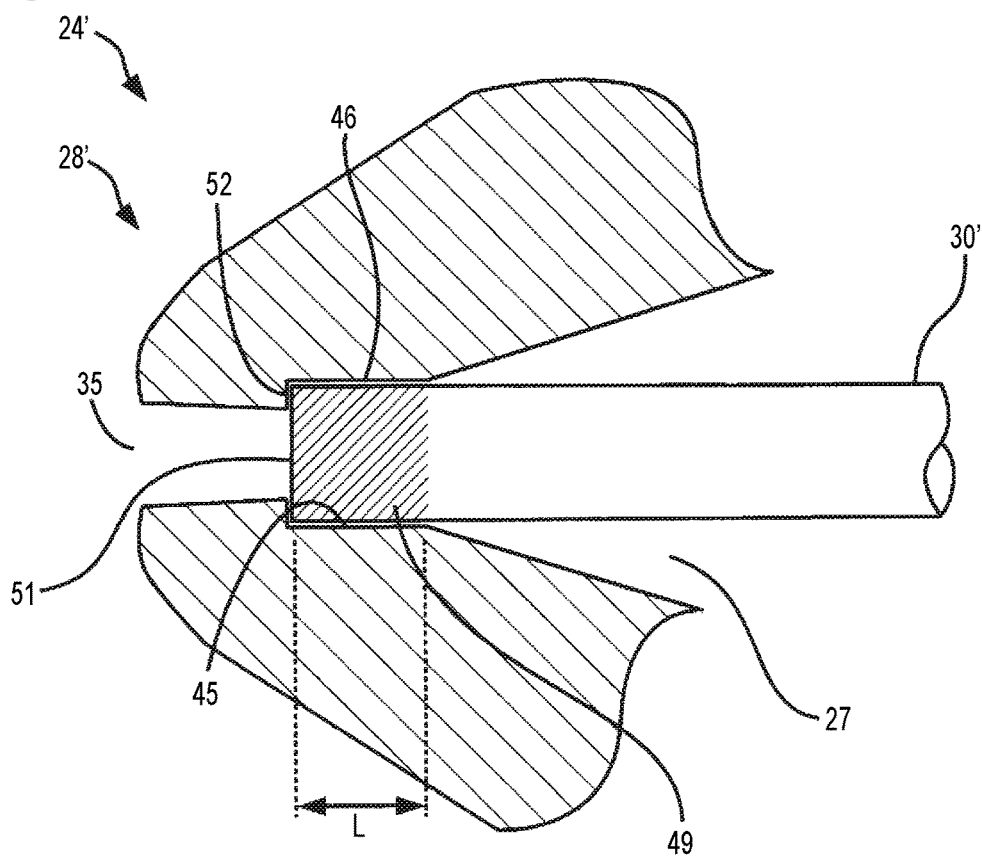
FIG. 6 is a front cross-sectional view showing a part of a shut-off nozzle according to a modification of the first illustrative embodiment in an enlarged manner.

The shut-off nozzle 24 (see FIGS. 3A, 3B, and 4) according to the first illustrative embodiment can be modified variously. For example, the guide portion 47 (see FIG. 4) at the tip of the needle valve 30 can be omitted. FIG. 6 shows a shut-off nozzle 24' according to a modification in which a tip of a needle valve 30' is deformed into a flat end surface 51. In the shut-off nozzle 24', the vicinity of the tip of the in-nozzle flow path 27 in a nozzle body portion 28' is also deformed, and a tip of the cylindrical hole portion 45 is formed into a step portion 52. The shut-off nozzle 24' according to the modification is also provided in the injection molding machine 1 shown in FIG. 1 and is configured as shown in FIG. 2 except for a shape of the tip of the needle valve 30' and a shape of a tip of the nozzle body portion 28'. Therefore, such description will be omitted.

Second Illustrative Embodiment

A second illustrative embodiment will be described with reference to FIGS. 7A and 7B. A configuration of an injection molding machine according to the second illustrative embodiment is basically the same as the configuration of the injection molding machine 1 (see FIG. 1) according to the first illustrative embodiment. A configuration of a shut-off nozzle 24A is basically the same as the configuration of the shut-off nozzle 24 according to the first illustrative embodiment shown in FIG. 2. Only a part of the shut-off nozzle 24A, that is, only configurations of a needle valve 30A and a nozzle body portion 28A are difference from those in the first illustrative embodiment. Therefore, description of the configuration of the injection molding machine and an overall configuration of the shut-off nozzle 24A will be omitted.

Figure 7A:
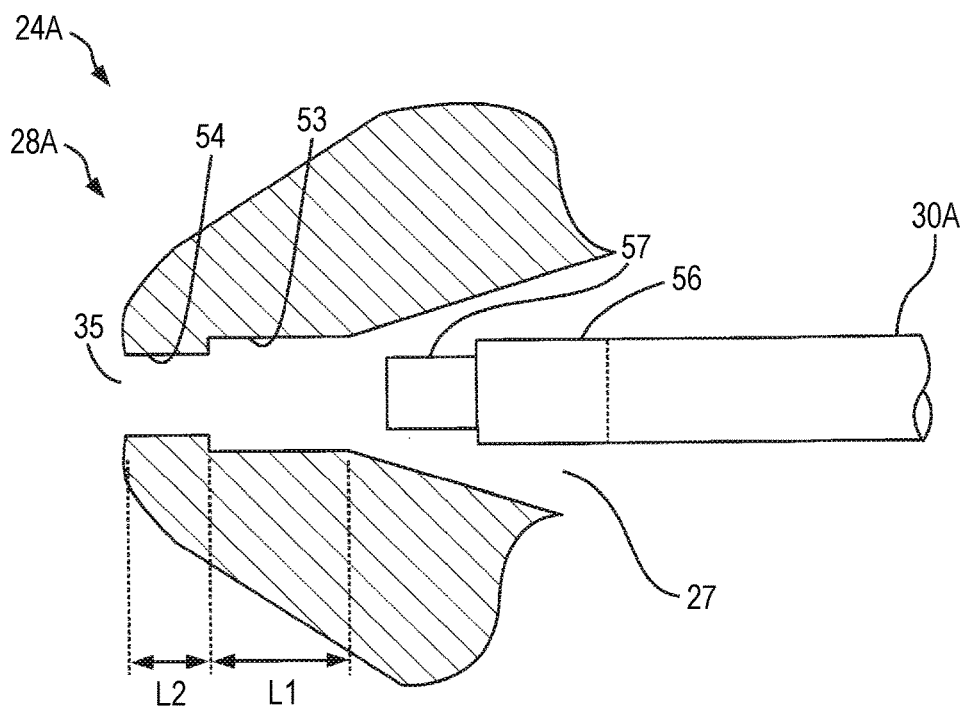
FIG. 7A is a front cross-sectional view showing a part of a shut-off nozzle according to a second illustrative embodiment in an enlarged manner.
Figure 7B:
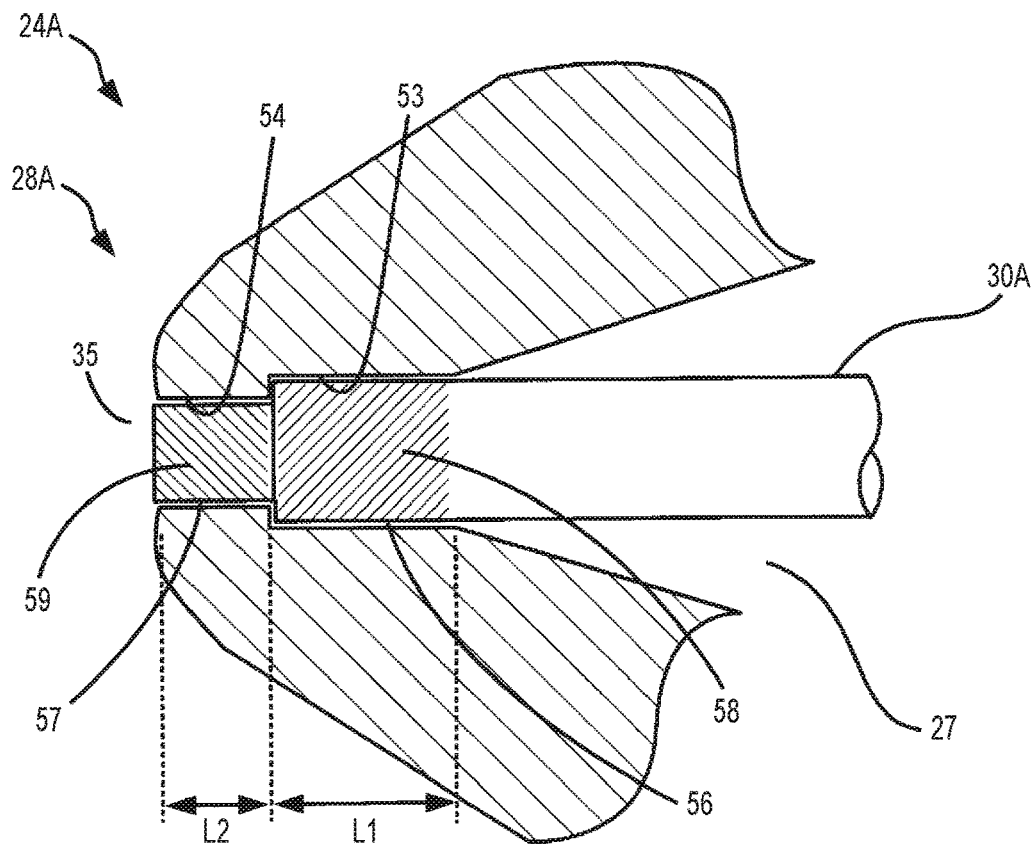
FIG. 7B is a front cross-sectional view showing a part of the shut-off nozzle according to the second illustrative embodiment in an enlarged manner.

As shown in FIG. 7A, in the shut-off nozzle 24A according to the second illustrative embodiment, a plurality of cylindrical hole portions 53 and 54 are formed in a tip of the nozzle body portion 28A. That is, the first cylindrical hole portion 53 and the second cylindrical hole portion 54 are formed. The second cylindrical hole portion 54 is formed on a tip side relative to the first cylindrical hole portion 53 and has a diameter smaller than a diameter of the first cylindrical hole portion 53. Lengths of the cylindrical hole portions 53 and 54 are L1 and L2, respectively.

The needle valve 30A includes, at a tip thereof, a first cylindrical portion 56 and a second cylindrical portion 57 corresponding to the first and second cylindrical hole portions 53 and 54. An inner diameter of the first cylindrical hole portion 53 is slightly larger than an outer diameter of the first cylindrical portion 56. An inner diameter of the second cylindrical hole portion 54 is slightly larger than an outer diameter of the second cylindrical portion 57. When the needle valve 30A is moved forward, as shown in FIG. 7B, the first cylindrical portion 56 is fitted into the first cylindrical hole portion 53, and the second cylindrical portion 57 is fitted into the second cylindrical hole portion 54, thereby forming first and second mechanical seal portions 58 and 59. A resin flow is blocked by the first and second mechanical seal portions 58 and 59, and thus drooling is prevented.

OTHER MODIFICATIONS

Figure 8:
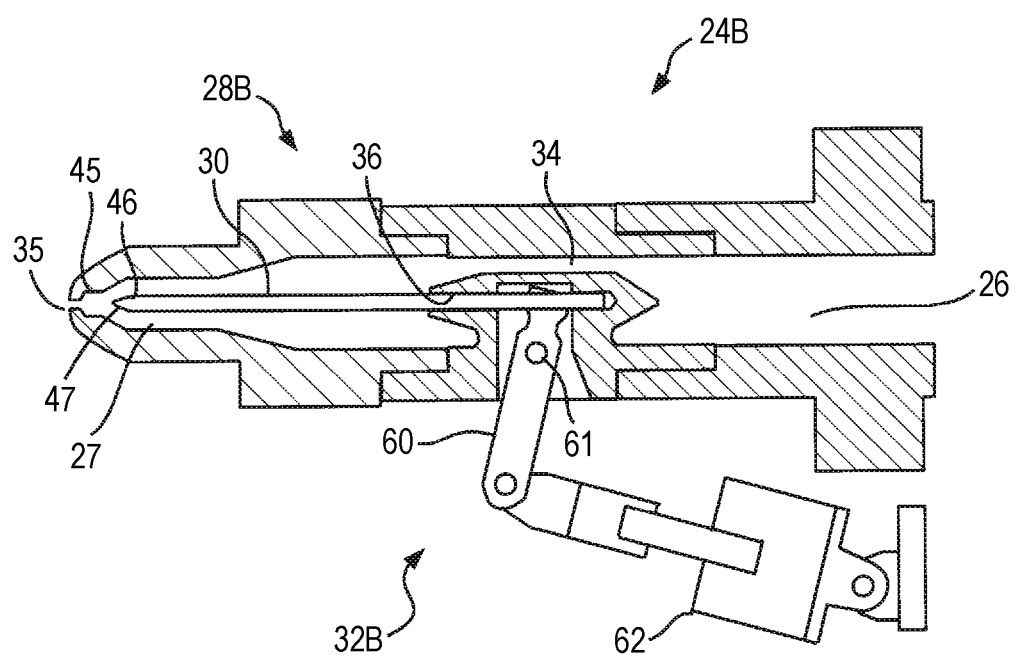
FIG. 8 is a front cross-sectional view showing a shut-off nozzle according to a modification of the first and second illustrative embodiments.

The injection molding machine 1 according to the first illustrative embodiment may be modified in other ways. For example, in the shut-off nozzle 24 (see FIG. 2), the needle driving mechanism 32 configured to drive the needle valve 30 can be deformed. FIG. 8 shows a shut-off nozzle 24B including a deformed needle driving mechanism 32B. In the shut-off nozzle 24B, a lever 60 is inserted in a nozzle body portion 28B. The lever 60 is coupled to the needle valve 30 and swivels around a rotation shaft 61. The lever 60 is connected to a cylinder unit 62 driven by air. Therefore, when compressed air is supplied to the cylinder unit 62, the lever 60 swivels, and the needle valve 30 moves forward. Alternatively, the needle valve 30 moves backward. Accordingly, the in-nozzle flow path 27 is opened and closed.

Other modifications are possible. In the shut-off nozzle 24A (see FIG. 7A) according to the second illustrative embodiment, the two cylindrical hole portions 53 and 54 are formed in the nozzle body portion 28A. However, the number of the cylindrical hole portions 53, 54, and so on may be three or more. In this case, the number of the cylindrical portions 56, 57, and so on provided on the needle valve 30A is necessarily the same.

Although the invention made by the present inventors is specifically described based on the illustrative embodiment, it is needless to say that the present invention is not limited to the illustrative embodiment described above, and various modifications can be made without departing from the scope of the invention. The plurality of examples described above may be appropriately combined.

What is claimed is:

1. A shut-off nozzle comprising:
a nozzle body portion having an in-nozzle flow path formed therein; and
a needle valve that is inserted into the nozzle body portion coaxially with the nozzle body portion and is configured to open and close an outlet of the in-nozzle flow path,
wherein a cylindrical portion is formed in the vicinity of a tip portion of the needle valve,
wherein a cylindrical hole portion is formed in the vicinity of a tip portion of the in-nozzle flow path, the cylindrical hole portion being a cylindrical hole,
wherein the cylindrical portion is configured to be fitted into the cylindrical hole portion in a case where the needle valve is driven in a forward direction to form a mechanical seal portion having an annular gap with a flow resistance sufficient to prevent resin flow.

2. The shut-off nozzle according to claim 1, wherein a guide portion is formed in the needle valve on a tip side relative to the cylindrical portion, a diameter of the guide portion decreasing toward a tip direction.

3. The shut-off nozzle according to claim 1, wherein the cylindrical hole portion is formed to extend over a predetermined length along and in parallel with an axial direction.

4. The shut-off nozzle according to claim 1,
wherein the outlet of the in-nozzle flow path has a first diameter, and
wherein the cylindrical hole portion has a second diameter, the second diameter being larger than the first diameter.

5. The shut-off nozzle according to claim 4,
wherein the cylindrical hole portion is formed on a side opposite to the tip direction from the outlet, and
wherein a cross-sectional area of the in-nozzle flow path gradually and continuously decreases in a tip direction from the cylindrical hole portion toward the outlet.

6. The shut-off nozzle according to claim 1, wherein a cross-sectional area of the in-nozzle flow path decreases stepwise in a tip direction from the cylindrical hole portion toward the outlet.

7. The shut-off nozzle according to claim 1,
wherein in the needle valve, a plurality of the cylindrical portions are formed in an axial direction, and a diameter of the plurality of cylindrical portions decreases in the axial direction toward a tip of the needle valve,
wherein a plurality of the cylindrical hole portions are formed in the axial direction in the in-nozzle flow path, and a diameter of the plurality of cylindrical hole portions decreases in the axial direction toward a tip of the in-nozzle flow path, and
wherein in a case where the needle valve is moved forward, the plurality of cylindrical portions is fitted into the plurality of cylindrical hole portions, respectively.

8. The shut-off nozzle according to claim 1, wherein when the cylindrical portion is fitted into the cylindrical hole portion, no conical structure around the tip portion is exposed to resin pressure in the in-nozzle flow path.

9. The shut-off nozzle according to claim 1, wherein the cylindrical portion and the cylindrical hole portion are configured to form the mechanical seal portion when fitted together, the mechanical seal portion comprising the annular gap that creates flow resistance based on resin viscosity over its entire length.

10. An injection device comprising:
a heating cylinder;
a screw inserted in the heating cylinder; and
a shut-off nozzle provided in the heating cylinder,
wherein the shut-off nozzle comprises:
a nozzle body portion having an in-nozzle flow path formed therein; and
a needle valve that is inserted into the nozzle body portion coaxially with the nozzle body portion and is configured to open and close an outlet of the in-nozzle flow path,
wherein a cylindrical portion is formed in the vicinity of a tip of the needle valve,
wherein a cylindrical hole portion is formed in the vicinity of a tip of the in-nozzle flow path, the cylindrical hole portion being a cylindrical hole,
wherein in a case where the needle valve is driven in a forward direction, the cylindrical portion is fitted into the cylindrical hole portion to form a mechanical seal portion having an annular gap with a flow resistance sufficient to prevent resin flow.

11. The injection device according to claim 10, wherein a guide portion is formed in the needle valve on a tip side relative to the cylindrical portion, a diameter of the guide portion decreasing toward a tip direction.

12. The injection device according to claim 10,
wherein in the needle valve, a plurality of the cylindrical portions are formed in an axial direction, and a diameter of the plurality of cylindrical portions decreases in the axial direction toward the tip portion of the needle valve,
wherein a plurality of the cylindrical hole portions are formed in the axial direction in the in-nozzle flow path, and a diameter of the plurality of cylindrical hole portions decreases in the axial direction toward the tip portion of the in-nozzle flow path, and wherein in a case where the needle valve is moved forward, the plurality of cylindrical portions is fitted into the plurality of cylindrical hole portions, respectively.

13. An injection molding machine comprising:
an injection device configured to inject resin; and
a mold clamping device configured to clamp a mold,
wherein the injection device comprises:
   a heating cylinder;
   a screw inserted in the heating cylinder; and
   a shut-off nozzle provided in the heating cylinder,
wherein the shut-off nozzle comprises:
   a nozzle body portion having an in-nozzle flow path formed therein; and
   a needle valve that is inserted into the nozzle body portion coaxially with the nozzle body portion and is configured to open and close an outlet of the in-nozzle flow path,
wherein a cylindrical portion is formed in the vicinity of a tip portion of the needle valve,
wherein a cylindrical hole portion is formed in the vicinity of a tip portion of the in-nozzle flow path, the cylindrical hole portion being a cylindrical hole,
wherein the cylindrical portion is configured to be fitted into the cylindrical hole portion in a case where the needle valve is driven in a forward direction to form a mechanical seal portion having an annular gap with a flow resistance sufficient to prevent resin flow.

14. The injection molding machine according to claim 13, wherein a guide portion is formed in the needle valve on a tip side relative to the cylindrical portion, a diameter of the guide portion decreasing toward a tip direction.

15. The injection molding machine according to claim 13, wherein in the needle valve, a plurality of the cylindrical portions are formed in an axial direction, and a diameter of the plurality of cylindrical portions decreases in the axial direction toward the tip portion of the needle valve,
wherein a plurality of cylindrical hole portions are formed in the axial direction in the in-nozzle flow path, and a diameter of the plurality of cylindrical hole portions decreases in the axial direction toward the tip portion of the in-nozzle flow path, and
wherein in a case where the needle valve is moved forward, the plurality of cylindrical portions is fitted into the plurality of cylindrical hole portions, respectively.

* * * * *